United States Patent Office 3,242,050
Patented Mar. 22, 1966

3,242,050
3-ENOLESTERS OF 1α,2α-METHYLENE-3-KETOSTEROIDS
Rudolf Wiechert, Berlin, Germany, assignor to Schering AG, Berlin, Germany
No Drawing. Filed July 10, 1964, Ser. No. 381,896
Claims priority, application Germany July 13, 1963, Sch 33,555
13 Claims. (Cl. 167—74)

The present invention relates to 3-enolesters of 1α,2α-methylene-3-ketosteroids and more particularly to 3-enolesters of 1α,2α-methylene-androstane - 17β - ol-3-one and of 17-esters thereof.

It is an object of the present invention to provide new 3-enolesters of 1α,2α-methylene-3-ketosteroids.

It is another object of the present invention to provide for the production of new 3-enolesters of 1α,2α-methylene-androstane-17β-ol-3-one and 17-esters thereof.

It is yet another object of the present invention to provide new and improved anabolic agents as well as to provide for the use of such agents to achieve an anabolic effect.

Other objects and advantages of the present invention will be apparent from a further reading of the specification and of the appended claims.

With the above and other objects in view, the present invention mainly comprises a compound of the formula:

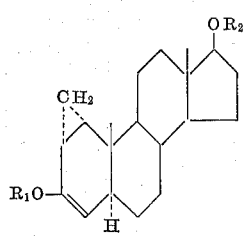

wherein $R_1$ is an acyl derived from an organic carboxylic acid, and wherein $R_2$ is an acyl derived from a physiologically compatible organic acid.

The substituent $R_1$ is preferably an acyl radical derived from an organic aliphatic carboxylic acid of 1–6 carbon atoms or from a benzoic acid. In the case of benzoic acid radicals it is preferred that the radical be either of benzoic acid itself, or of an alkyl substituted benzoic acid.

The substituent $R_2$ is preferably an acyl radical derived from an aliphatic monocarboxylic acid of up to 12 carbon atoms, which may be of branch chain or cyclic type, and which may be saturated or unsaturated, or it may be an acyl derived from a physiologically compatible aromatic or mixed aromatic-aliphatic, or of a heterocyclic acid. In general, it may be stated that the acyl radicals may be derived from all organic acids which are usual substituents in steroid chemistry.

The most preferred 17-esters are: formiate, acetate, propionate, butyrate, n-valerianate, isovalerianate, capronate, enanthate, trimethylacetate, cyclopentylpropionate, benzoate, phenylacetate, nicotinate, and tetrahydrofuranate.

As indicated above, the compounds of the present invention are highly effective anabolic agents, and compositions thereof, preferably in the form of an oily solution of the compound in a physiologically compatible oily vehicle such as sesame oil can be administered, most preferably subcutaneously, to achieve an anabolic effect. The amount of compound administered is preferably about 5–15 mg. per day.

The compounds of the present invention are preferably formed by reacting a 1α,2α-methylene-androstane-17β-ol-3-one or a 17β-ester thereof, i.e. a compound of the formula:

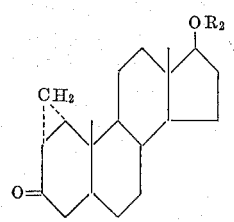

wherein $R_2$ has the same definition as above, preferably under the exclusion of atmospheric oxygen, particularly under a nitrogen atmosphere, with a compound which has the action of enolizing α,β-unsaturated ketones. This results in the production of the 3-enol ester derivative. The reactant may be, for example, isopropenylacetate or acid anhydrides in the presence of acid catalyst, particularly p-toluene sulfonic acid, or in the presence of alkali salts, preferably the sodium salt, of the corresponding acid, or with acid chlorides, preferably in the presence of an alkali metal, most preferably sodium.

This method can also be used to produce 3-enol ethers by reacting a 1α,2α-methylene-androstane-17β-ol-3-one or 17β-ester thereof of the above formula for example with ethylorthoformiate in the presence of an acid catalyst, preferably in the presence of concentrated sulfuric acid. If it is desired to produce higher 3-enol ethers, the initially formed 3-ethyl ether can be reacted to result in an interchange of ether radicals in known manner with a higher alkanol or cycloalkanol in the presence of an acid catalyst such as p-toluene sulfonic acid.

The reaction of the 1α,2α-methylene-androstane-17β-ol-3-one or its 17β-ester to form the 3-enol ester derivatives of the present invention results in the production of substantially only the new compounds of the present invention. This is quite surprising since it would be expected based on the article of R. Villotti, Am. Soc. 82 5693 (1960) that in the 3-keto-5α-series the Δ²-enol-acylate would normally be formed.

The compounds of the present invention, particularly the 3,17-diacetate, are highly effective anabolic agents which are particularly effective because of their very low side effects, and these compounds are of great advantage because of the favorable dissociation between the anabolic main effect and the androgenic side effect.

The ratio of anabolic to androgenic action ($O$=anabolic/androgenic)

was determined in the levator ani/seminal vesicle test on male, castrated rats after subcutaneous administration of the tested substance. The following table compares the Q-value (anabolic/androgenic) of different tested substances:

TABLE I

| Substance: | $Q$=anabolic/androgenic |
|---|---|
| 1α,2α - methylene - Δ³ - androstene-3,17-diol-diacetate | 10 |
| 1-methyl-Δ¹-androstene-17β-ol-3-one-acetate | 5 |
| Testosterone propionate | 1 |

In addition, the higher esters, particularly the 1α,2α-methylene - Δ³ - androstene - 3,17β - diol-3-acetate-17-enanthate, possess a protracted action.

In addition to the anabolic activity, the 1,2α-methylene-androstane-17β-ol-3-one-3-enol derivatives of the present invention possess a strong ovulation-inhibiting action. As compared to the known ovulation-inhibiting compounds II–IV (see Table 2 below) the compound 1,2α-methylene-Δ³-androstene-3,17β-diol-diacetate (I) of the present invention upon subcutaneous administration to normal female rats results in an ovulation-inhibiting activity of comparable strength as with the known compounds, however with the advantage that the compound of the present invention does not have any progestational action. In Table 2 below the value of $ED_{50}$ corresponds to the dose in mg./animal/day which after administration is four consecutive days causes 50% of the animals to have repressed (no) ovulation. This was controlled by means of inspection of the ovarian tubes.

TABLE II

| No. | Compound | $ED_{50}$ |
| --- | --- | --- |
| I | 1,2α-methylene-$\Delta^3$-androstene-3,17β-diol-diacetate. | 0.3 |
| II | 17α-ethinyl-$\Delta^4$-estrene-17β-ol | 1-3 |
| III | 6-chloro-$\Delta^{4,6}$-pregnadiene-17α-ol-3,20-dione-17-acetate. | 0.3-1 |
| IV | 17α-ethinyl-$\Delta^{5(10)}$-estrene-17β-ol-3-one | 0.3 |

The following examples are given to further illustrate the present invention. The scope of the invention is not, however, meant to be limited to the specific details of the examples.

Example 1

1,2α-METHYLENE-$\Delta^3$-ANDROSTENE-3,17β-DIOL-3,17-DIACETATE 2.5 g. of 1,2α-methylene-androstane - 17β - ol-3-one-17-acetate are heated in 145 cc. of isopropenylacetate with the addition of 4 drops of concentrate sulfuric acid, for 3 hours under refluxing. After cooling, the reaction mixture is taken up in ether, washed with water until neutral, and dried over sodium sulfate. After evaporation of the filtered ether solution to dryness, the residue is recrystallized from methanol with the addition of a small amount of pyridine, the recrystallization taking place over carbon. There is thus obtained 2.3 g. of 1,2α-methylene-$\Delta^3$-androstene-3,17β-diol-3,17-diacetate having a melting point of 140–141° C. $\epsilon_{210}=4880$ (methanol).

Example 2

500 mg. of 1,2α-methylene-androstane-17β-ol-3-one-17-acetate, 10 cc. of acetic acid anhydride and 15 cc. of acetyl chloride are heated for 4.5 hours under refluxing under a nitrogen stream. After the end of the reaction time, the reaction mixture is evaporated to dryness under vacuum, the residue is taken up in methanol, it is again evaporated to dryness under vacuum, and the remaining residue is recrystallized from methanol with the addition of a small amount of pyridine. There is thus obtained 380 mg. of 1,2α-methylene-$\Delta^3$-androstane-3,17β-diol-3,17-diacetate having a melting point of 140–140.5° C. $\epsilon_{210}=4800$ (methanol).

Example 3

1,2α-METHYLENE-$\Delta^3$-ANDROSTENE-3,17β-DIOL-3-ACETATE-17-PROPIONATE 600 mg. of 1,2α-methylene-androstane-17β-ol-3-one-17-propionate, 35 cc. of isopropenylacetate and 1 drop of concentrated sulfuric acid are reacted and worked up analogously to Example 1. After recrystallization of the isolated crude product from methanol with the addition of some pyridine there is obtained 450 mg. of 1,2α-methylene-$\Delta^3$-androstene - 3,17β - diol - 3 - acetate - 17-propionate having a melting point of 111.5–112.5° C. $\epsilon_{210}=4850$ (methanol).

Example 4

1,2α-METHYLENE-$\Delta^3$-ANDROSTENE-3,17β-DIOL-3-ACETATE-17-BUTYRATE 600 mg. of 1,2α-methylene-androstane-17β-ol-3-one-17-butyrate, 35 cc. of isopropenylacetate and 1 drop of concentrated sulfuric acid are reacted and worked up as described in Example 1. The isolated crude product is recrystallized from methanol with the addition of some pyridine. There is thus obtained 430 mg. of 1,2α-methylene-$\Delta^3$-androstene - 3,17β - diol - 3 - acetate-17-butyrate having a melting point of 120–121° C. $\epsilon_{211}=4910$ (methanol).

Example 5

1,2α-METHYLENE-$\Delta^3$-ANDROSTENE-3,17-DIOL-3-ACETATE-17-ENANTHATE 5 g. of 1,2α-methylene-androstane - 17β - ol-3-one-17-enanthate, 150 cc. of isopropenylacetate and 5 drops of concentrated sulfuric acid are treated and worked up analogously to Example 1. The remaining oily residue is subjected to chromatography over neutral aluminum oxide wtih benzene. There is thus obtained 3.5 g. of 1,2α-methylene - $\Delta^3$ - androstene-3,17-diol-3-acetate-17-enanthane. $\epsilon_{210}=4790$ (methanol).

Example 6

1,2α-METHYLENE-$\Delta^3$-ANDROSTENE-3,17β-DIOL-3-ACETATE-17-BENZOATE 600 mg. of 1,2α-methylene-androstane - 17β - ol-3-one-17-benzoate, 35 cc. of isopropenylacetate and 1 drop of concentrated sulfuric acid are treated and worked up analogously to Example 1. The remaining residue is recrystallized from methanol with the addition of a small amount of pyridine. There is thus obtained 400 mg. of 1,2α-methylene - $\Delta^3$ - androstene - 3,17β - diol-3-acetate-17-benzoate having a melting point of 180–181.5° C. $\epsilon_{228}=16400$ (methanol).

Example 7

1,2α-METHYLENE-$\Delta^3$-ANDROSTENE-3,17β-DIOL-3-PROPIONATE-17-ACETATE 2.0 g. of 1,2α-methylene-androstane-17β-ol-3-one-17-acetate, 2.52 g. of sodium propionate and 30 cc. of propionic acid anhydride are heated under refluxing and stirring for 16 hours in the presence of a nitrogen atmosphere. The reaction mixture is then stirred into ice water/pyridine, the resulting precipitate is filtered off, taken up in ether, washed with dilute hydrochloric acid, sodium bicarbonate solution and water until neutral. After drying over sodium sulfate, the filtered ether solution is evaporated to dryness under vacuum and subjected to chromatography over neutral aluminum oxide with benzene. The isolated crude product is recrystallized from methanol in a small amount of pyridine. There is thus obtained 200 mg. of 1,2α-methylene-$\Delta^3$-androstene-3,17-diol-3-propionate-17-acetate having a melting point of 138.5–139.5° C. $\epsilon_{210}=4900$ (methanol).

Example 8

1,2α-METHYLENE-$\Delta^3$-ANDROSTENE-3,17β-DIOL-3-BUTYRATE-17-ACETATE 2.0 g. of 1,2α-methylene-androstane-17β-ol-3-one-17-acetate, 2.52 g. of sodium butyrate and 30 cc. of butyric acid anhydride are heated under refluxing and stirring for 3 hours in the presence of a nitrogen atmosphere. After further working up analogously to Example 7 and subjecting to chromatography on neutral aluminum oxide with benzene, and after recrystallization from methanol with a small amount of pyridine, there is obtained 450 mg. of 1,2α-methylene-$\Delta^3$-androstene-3,17β-diol-3-butyrate - 17 - acetate having a melting point of 129–130° C.

Example 9

1,2α-METHYLENE-$\Delta^3$-ANDROSTENE-3,17β-DIOL-3-BENZOATE-17-ACETATE 500 mg. of 1,2α-methylene-androstane-17β-ol-3-one-17-acetate, 10 cc. of water-free toluene and 0.4 cc. of benzoyl chloride are heated under refluxing for 48 hours. After cooling, the reaction mixture is evaporated to dryness under vacuum, the residue is taken up in ether, the ether solution is washed several times with water, dried over sodium sulfate and evaporated to dryness under vacuum. By recrystallization from methanol with a small amount of pyridine there is obtained from the crude product 200 mg. of 1,2α-methylene-$\Delta^3$-androstene-3,17β-diol-3-benzoate-17-acetate having a melting point of 147–157° C. $\epsilon_{229}=15700$ (methanol).

Example 10

1,2α-METHYLENE-Δ³-ANDROSTENE-3,17β-DIOL-3,17-DIBENZOATE 500 mg. of 1,2α-methylene-androstane-17β-ol-3-one-17-benzoate, 10 cc. of water-free toluene and 0.4 cc. of benzoyl chloride are treated and worked up analogously to Example 9. By recrystallization from methanol/methylene chloride with the addition of a small amount of pyridine there is obtained from the isolated crude product 175 mg. of 1,2α-methylene-Δ³-androstene-3,17β-diol-3,17-dibenzoate having a melting point of 199.5–201.5° C. $\epsilon_{229}$=29900 (methanol/methylenechloride).

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A compound of the formula

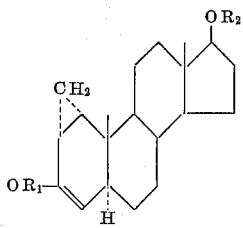

wherein $R_1$ is acyl derived from a member of the group consisting of aliphatic carboxylic acids having 1–6 carbon atoms and benzoic acid and $R_2$ is an acyl derived from a member selected from the group consisting of aliphatic carboxylic acids having 1–12 carbon atoms and benzoic acid.

2. Anabolic composition comprising an oily solution of the compound of claim 1 in a physiologically compatible oily vehicle.
3. Method of achieving an anabolic effect which comprises administering to a host mammal a compound according to claim 1.
4. Method of claim 3 wherein about 5 to 15 mg. per day of said compound is administered.
5. 1α,2α-methylene-Δ³ - androstene-3,17β - diol - 3,17 - diacetate.
6. 1α,2α-methylene-Δ³-androstene-3,17β-diol-3-acetate-17-propionate.
7. 1α,2α-methylene-Δ³-androstene-3,17β-diol-3-acetate-17-butyrate.
8. 1α,2α-methylene-Δ³-androstene-3,17-diol-3 - acetate-17-enanthate.
9. 1α,2α-methylene-Δ³-androstene-3,17β-diol-3-acetate-17-benzoate.
10. 1α,2α-methylene-Δ³-androstene-3-17-diol - 3 - propionate-17-acetate.
11. 1α,2α-methylene-Δ³-androstene - 3,17β - diol - 3 - butyrate-17-acetate.
12. 1α,2α-methylene-Δ³-androstene - 3,17β - diol - 3 - benzoate-17-acetate.
13. 1α,2α-methylene-Δ³-androstene - 3,17β - diol - 3,17 - dibenzoate.

References Cited by the Examiner

Deghenghi et al.: J.A.C.S., vol. 82, pages 3201–09 (1960).

LEWIS GOTTS, *Primary Examiner.*

HENRY A. FRENCH, *Assistant Examiner.*